R. G. GOLDMAN & C. R. HARRIS.
ROTARY FLUID CLUTCH.
APPLICATION FILED APR. 23, 1913.
1,174,853.
Patented Mar. 7, 1916.
3 SHEETS—SHEET 1.
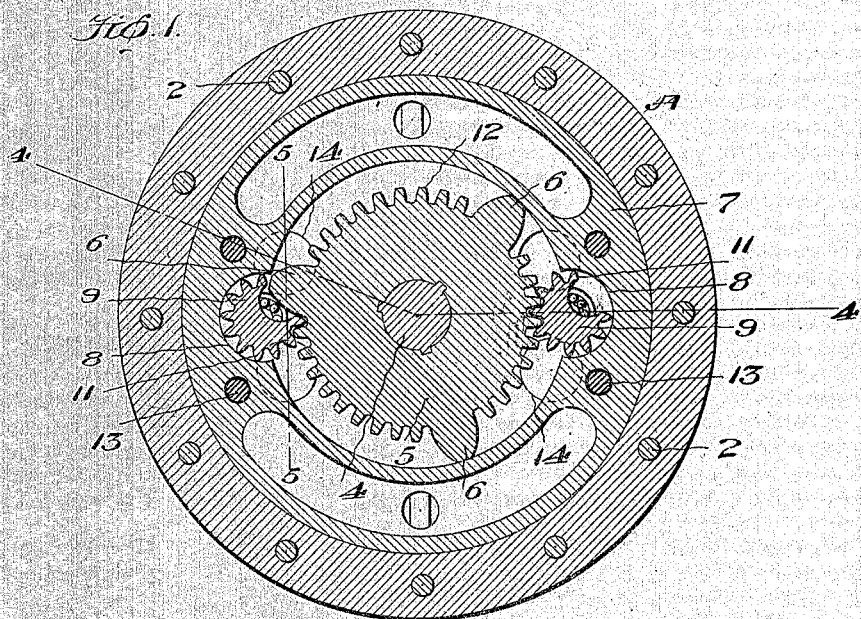
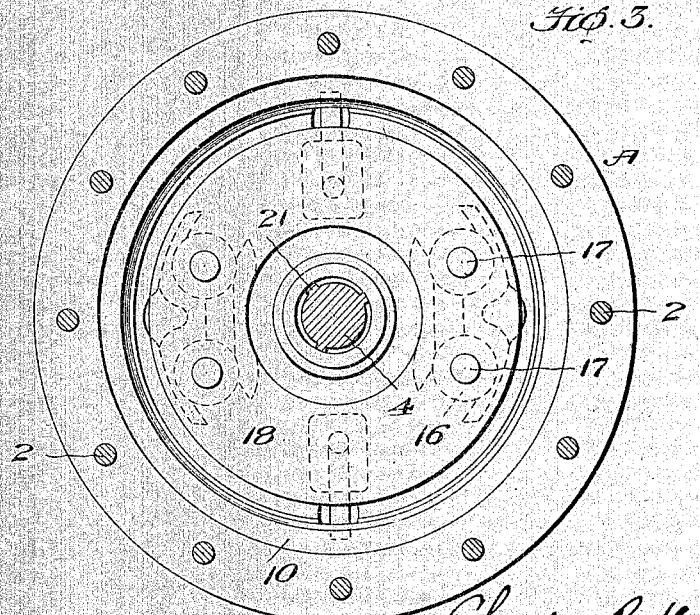
Inventors
Charles R. Harris
and
Rutherford G. Goldman
By Vernon E. Hodge
Attorney
Witnesses
A. A. Hammond

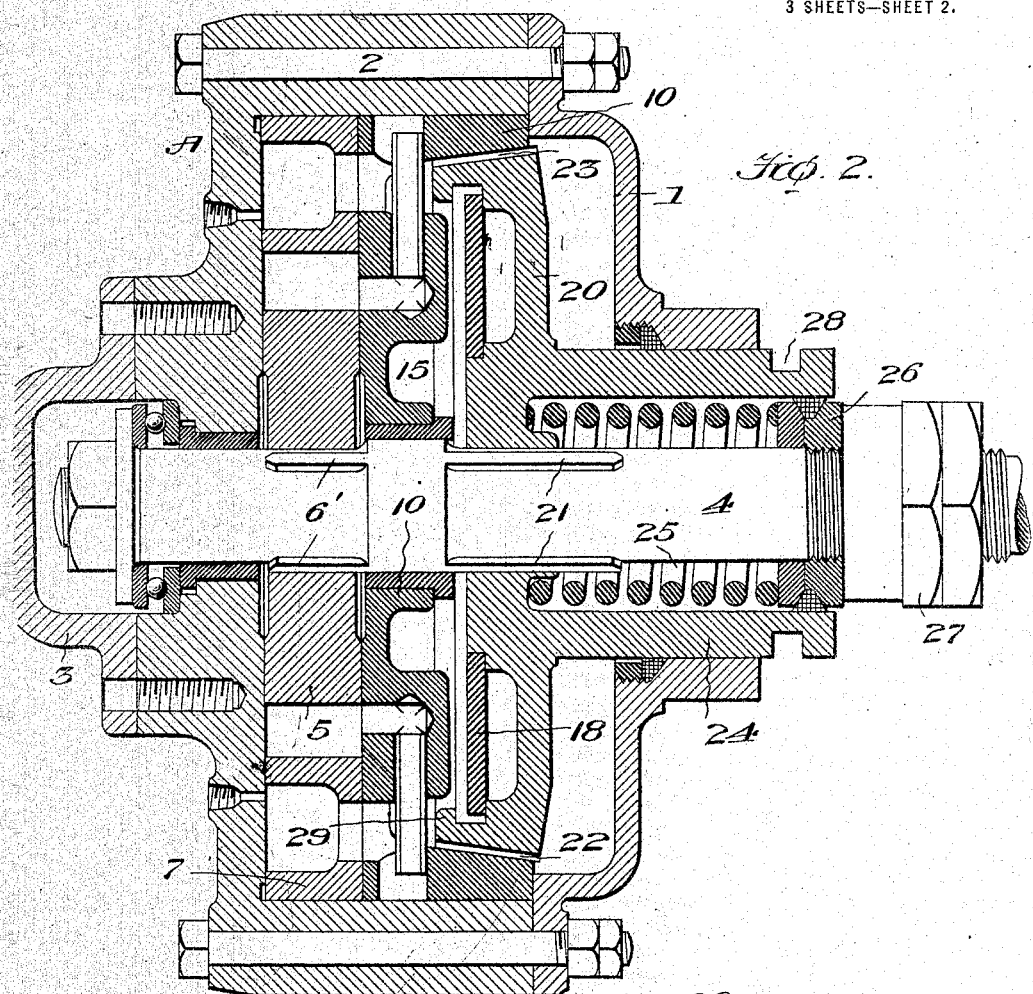
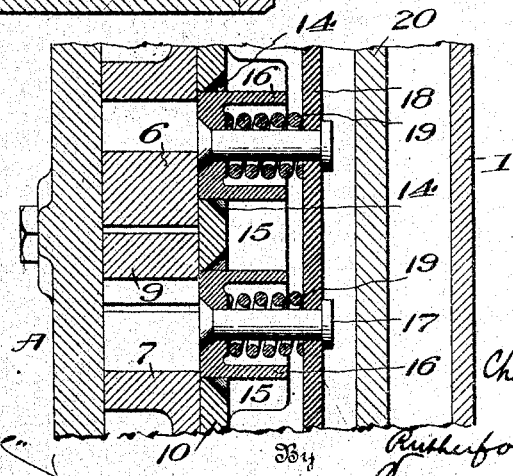

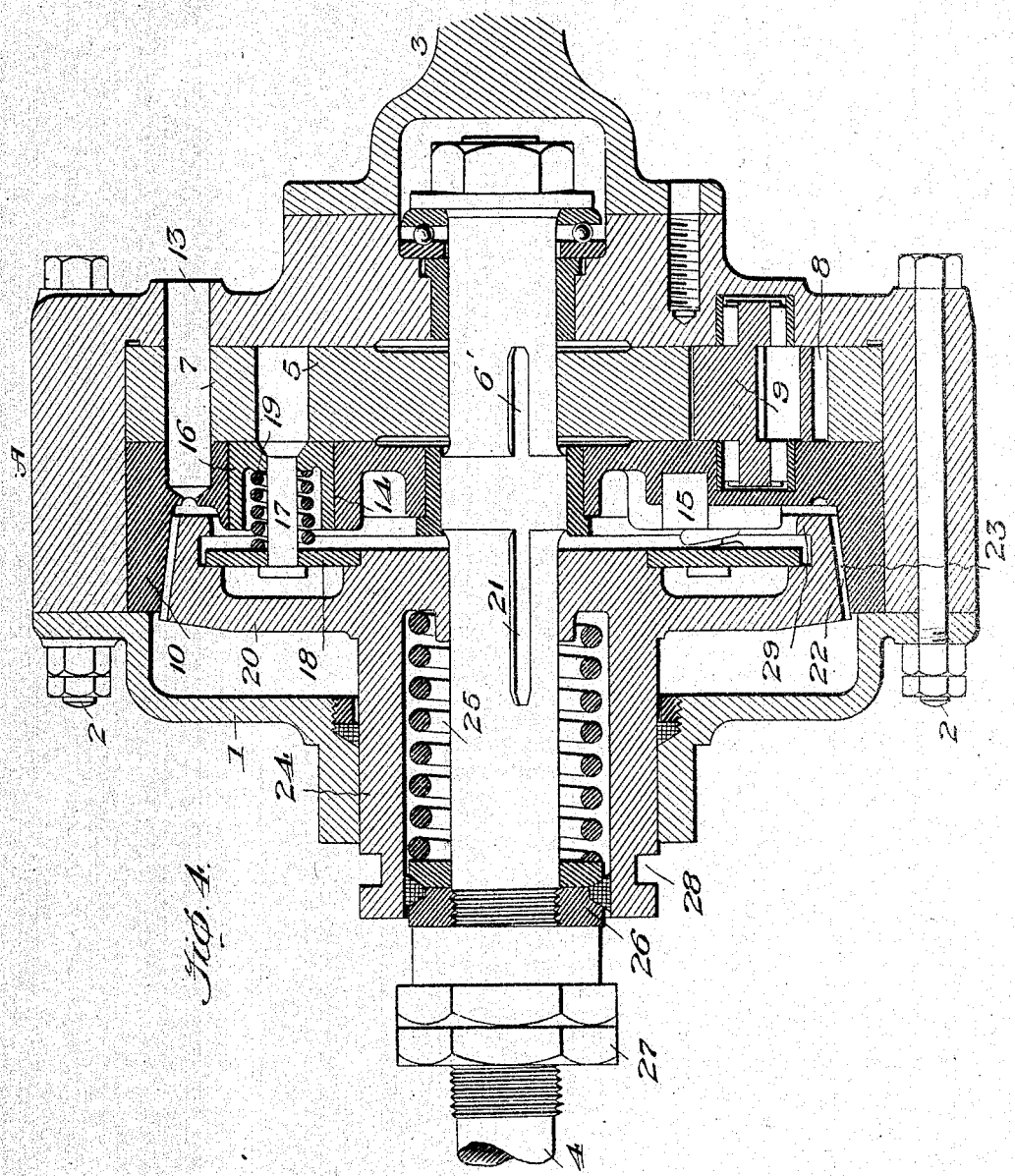

UNITED STATES PATENT OFFICE.

RUTHERFORD G. GOLDMAN AND CHARLES R. HARRIS, OF LOS ANGELES, CALIFORNIA.

ROTARY FLUID-CLUTCH.

1,174,853.                   Specification of Letters Patent.          Patented Mar. 7, 1916.

Application filed April 23, 1913. Serial No. 763,108.

*To all whom it may concern:*

Be it known that we, RUTHERFORD G. GOLDMAN and CHARLES R. HARRIS, citizens of the United States, residing at Los Angeles, in the county of Los Angeles and State of California, have invented certain new and useful Improvements in Rotary Fluid-Clutches, of which the following is a specification.

Our invention relates to an improvement in rotary fluid clutches, and more particularly to that class of transmission devices wherein one member is capable and adapted to rotate about the other until the air between the two members is compressed, causing the two members to be locked together and rotate as a unit.

The object of this invention is to provide means whereby the air can be compressed for locking the driving and driven elements together so that they will rotate as a unit.

Another object is to provide a clutch or transmission device that will be simple, effective, and easily controlled that will take up the first shock or sudden torque on the compression of air, giving a cushion effect, but which may, at the will of the operator, be thrown into a positive mechanical drive, and a device which will give any ratio of speed from zero to maximum at the will of the operator.

The invention consists of certain novel features of construction and combinations of parts which will be hereinafter described and pointed out in the claims.

In the accompanying drawings: Figure 1 is a horizontal sectional view of the invention; Fig. 2 is a longitudinal vertical sectional view; Fig. 3 is an end view showing one of the end members and cone removed; Fig. 4 is a sectional view on the line 4—4 of Fig. 1; and Fig. 5 is a detail sectional view on line 5—5 of Fig. 1.

A represents the casing, which is provided with an open end, which is adapted to be closed by an end member or cover 1, the cover and casing being connected together by means of bolts 2. A driving shaft 3 is connected to the casing A for transmitting rotary movement to the casing. Journaled in the casing and cover 1 is a shaft 4, which is loosely mounted within the casing and cover so that the casing is rotatable independently of the shaft. A rotor 5 is mounted upon the shaft, and is connected thereto by means of keys 6'. The rotor is provided with a number of abutments 6. Located within the casing and inclosing the rotor 5 is a ring 7. This ring is provided with recesses 8, in which rotary abutments 9 are received, the rotary abutments being journaled in the casing and intermediate member or plate 10, which is located adjacent to the ring 7. The rotary abutments 9 are provided with teeth 11, which are adapted to mesh with teeth 12 on the rotor 5, the rotary abutments being journaled so that they are capable of rotating about the rotor 5 without transmitting any movement to the rotor and shaft 4 when the casing is rotated. The casing ring 7 and intermediate member or plate 10 are connected together by means of pins 13. The intermediate member or plate 10 is provided with ports or openings 14, 14 on each side of each rotary abutment 9 which lead into equalizing chambers 15. Valves 16, 16 are mounted to slide in the ports or openings 14 for the purpose of closing the ports during the compression. These valves are provided with valve stems 17, which stems are connected to a disk or annular member 18, and located between the member 18 and the valves are springs 19, which springs are encircled about the valve stems 17. A cone clutch member 20 is slidably mounted upon the shaft 4 and is splined thereto by means of keys 21. The clutch face 22 of the cone clutch 20 is adapted to engage the conical clutching face 23 of the intermediate member of plate 10 when the cone clutch is moved to its limit of movement. The clutch 20 is provided with a hub or sleeve 24, which is recessed on its inner surface for the reception of a spiral spring 25, the spring bearing against nut 26 on the shaft 4. A nut 27 is secured on the shaft 4 and against nut 26 for holding it in place. An annular groove 28 is formed in the sleeve whereby the sleeve can be actuated for forcing the clutch into engagement with the clutch face of the member 10. A spring 25 tends to force the cone clutch inwardly toward the intermediate member 10.

Mounted upon the clutch member 20 is the disk on annular member 18. A shoulder 29 on the clutch member 20 is adapted to engage the member 18, when the valves are drawn away from the ports 14 to permit the air in the compression chamber, which is formed between the rotor and ring 7, to flow freely through the equalizing chambers and allow the casing to rotate freely about the rotor.

When the sleeve or clutch member 20 is actuated against the action of the spring 25, the shoulder 29 will engage the member 18, causing the valves to be removed from the ports, and this movement brings the clutch face of the clutch member 20 and the other face from engagement. These clutch faces, however, are brought out of engagement with each other prior to the action on the member 18 for removing the valves away from the ports 14, and the clutch faces are not brought into engagement with each other until after the valves are closed to prevent the flow of air from the compression chamber to the equalizing chambers. The valves can be moved for opening or closing the ports 14 either gradually or suddenly, as desired.

It will be seen that when the cone clutch 20 is moved, the valves will be carried with it, thereby opening the passage from the compression chamber to the equalizing chambers, so that the casing is capable of free movement independently of the rotor, but when the cone is released, the spring 25 will cause the clutch to return to its normal position, and after the valves have become seated, the clutch will engage the clutch face of the member 10, thereby locking the two members together so that the entire apparatus will rotate as a unit.

Assuming that the valves are seated and in a closed position and the drive shaft 3 is rotating, the rotation of the shaft 2 will cause the casing to be rotated about the rotor 5; the rotation of the casing around the rotor will cause the air between each rotary abutment and each abutment to be compressed, that is, the quantity or body of air between the abutment and the approaching rotary abutment will be compressed, and the compression will be continued until the driven shaft 4 and the rotor 5, which is mounted therein, are rotating with the casing and driving shaft as a unit. The beginning of the compression on the rotation of the casing about the rotor is not taken up by a sudden jerk or undue strain upon the various parts, but rather the first shock is taken up on a cushion of air, and as the speed of the two shafts 2 and 4 becomes equal, the friction cone 20 is thrown in, which makes a frictional drive.

Having fully described our invention, what we claim as new and desire to secure by Letters Patent is:

1. In a transmission device, the combination with a casing and a rotor, having a compression chamber formed therebetween, means for driving the casing independently of the rotor, rotary abutments journaled in the casing, abutments on the rotor, whereby the air can be compressed between the abutments and rotary abutments, equalizing chambers in communication with the compression chamber for conducting the air from one side of the rotary abutments to the other, and means for normally closing said equalizing chambers, whereby the air is compressed, causing the rotor and casing to be rotated as a unit.

2. In a transmission device, the combination with a casing and a rotor, having a compression chamber formed therebetween, means for driving the casing independently of the rotor, rotary abutments journaled in the casing, abutments on the rotor, whereby the fluid can be compressed between the abutments and rotary abutments, equalizing chambers in communication with the compression chamber for conducting the fluid from one side of the rotary abutments to the other, valves for closing the equalizing chambers whereby the fluid in the compression chamber will be compressed as the casing rotates about the rotor, causing the casing and runner to be locked together and rotate as a unit, means carrying said valves, and means for normally holding said valves in a position for closing the equalizing chambers.

3. In a transmission device, the combination with a casing and a rotor, said casing adapted to rotate independently of the rotor, a compression chamber between the rotor and casing, of rotary abutments journaled in the casing, abutments on the rotor for compressing the air in the casing between the rotary abutments and abutments, equalizing chambers in communication with the compression chamber, valves for closing the equalizing chambers, and means for normally forcing the valves into a position for closing the equalizing chambers, whereby the air is compressed in the compression chamber, causing the rotor and casing to rotate as a unit.

4. In a transmission device, the combination with a casing and a rotor, said casing adapted to rotate independently of the rotor, a compression chamber between the rotor and casing, of rotary abutments journaled in the casing, abutments on the rotor for compressing the air between the rotary abutment and abutments, equalizing chambers in communication with the compression chamber, valves for closing the equalizing chambers whereby compression can take place in the compression chamber for locking the rotor and casing together, an annular member connected to the valves, means connected to said annular member for actuating said valves for opening the equalizing chambers upon the movement of said means, and means engaging said means for normally holding the valves in a position for closing the equalizing chambers.

5. In a transmission device, the combination with a casing and a rotor, said casing adapted to rotate independently of the rotor, a compression chamber between the rotor and casing, of rotary abutments journaled in the casing, abutments on the rotor for compressing the air between the rotary abutment and abutments, equalizing chambers in communication with the compression chamber; valves for closing the equalizing chambers whereby compression can take place in the compression chamber for locking the rotor and casing together, an annular member connected to the valves, a clutch member engaging said annular member adapted on its movement to operate the valves for the purpose of opening the equalizing chambers, a clutch face on the casing, and means for actuating said clutch member for causing it to move the valves into a position for closing the equalizing chambers, and then said means forcing the clutch member into engagement with the clutch face.

6. In a transmission device, the combination with a casing and a rotor, having a compression chamber formed therebetween, said casing adapted to rotate independently of the rotor, of rotary abutments journaled in the casing, abutments on the rotor arranged so that compression will take place between at least one of said abutments and a rotary abutment when said piston is at any point in the compression chamber, equalizing chambers in communication with the compression chamber, valves for closing the equalizing chambers, means for actuating said valves, and means for normally holding said valves in a position for closing the equalizing chambers.

In testimony whereof we affix our signatures, in the presence of two wintnesses.

RUTHERFORD G. GOLDMAN.
CHARLES R. HARRIS.

Witnesses:
E. D. FOSTER,
O. B. GRAHAM.